INVENTORS
JOHANNES KAASHOEK
JOHANNES W. VERSLUIS
PIET G.J. BARTEN
BY
AGENT

INVENTORS
JOHANNES KAASHOEK
JOHANNES W. VERSLUIS
PIET G. J. BARTEN
BY
AGENT

INVENTORS
JOHANNES KAASHOEK
JOHANNES W. VERSLUIS
PIET G. J. BARTEN

BY

AGENT

INVENTORS
JOHANNES KAASHOEK
JOHANNES W. VERSLUIS
PIET G.J. BARTEN
BY
AGENT

United States Patent Office 3,440,483

Patented Apr. 22, 1969

3,440,483

COLOR TELEVISION DISPLAY DEVICE

Johannes Kaashoek, Johannes Willem Versluis, and Piet Gerard Joseph Barten, Emmasingel, Eindhoven, Netherlands, assignors, by mesne assignments, to U.S. Philips Corporation, New York, N.Y., a corporation of Delaware Filed Mar. 21, 1968, Ser. No. 714,874
Claims priority, application Netherlands, Mar. 22, 1967, 6704218
Int. Cl. H01j 29/70
U.S. Cl. 315—24 15 Claims

ABSTRACT OF THE DISCLOSURE

A deflection system for a color television display device having two deflection coil systems orthogonal beam deflection, in which the coils for one direction of deflection have two symmetrical halves. Opposite correction currents are applied to the two halves in order to correct for anisotropic astigmatism. The correction currents are a function of the product of the deflection currents of the two coil systems.

The invention relates to a color television display device comprising a cathode-ray tube having a display screen and a first and second deflection coil system, at least the first of which comprises two substantially symmetrical coil halves, arranged one on each side of the neck of the cathode-ray tube, said deflection coil systems deflecting by means of deflection currents at least one electron beam produced in the cathode-ray tube in two orthogonal directions.

The construction of a cathode-ray tube of such a display device may be quite different; the cathode-ray tube may be of the indexing type, the shadow-mask type or the chromatron type. The differences in types reside especially in the structural differences on and near the display screen of the cathode-ray tube and in the number of required electron beams.

For luminescing under the action of an incident electron beam the display screen of a color television cathode-ray tube has phosphors luminescing in different colors and arranged in parallel strips in the indexing tube and in the chromatron, and in dots in the shadow-mask tube. In the modern indexing tube and the shadow-mask tube one electron beam and three electron beams respectively are employed, whereas the chromatron may use one electron beam or three electron beams.

In order to obtain adequate brightness and purity of colors of a picture on a display screen having phosphor strips or dots, the point of impact of an electron beam has to cover the strip or the dot to the optimum without transgressing the same. For the strips in the indexing tube an elliptical impact is chosen, the longitudinal axis of the ellipse extending in the direction of the strip, whereas for the dots of the shadow-mask tube a circular impact point is chosen.

The various types of cathode-ray tubes involve the following problems.

The longitudinal axis of the ellipitical impact point in the indexing tube exhibits a rotation in the plane of the display screen in accordance with the extent of the deflection of the electron beam by the two deflection coil systems. This is a consequence of the chosen design of the deflection coil systems aiming at a minimum transverse axis of the ellipse. At the corners of the display screen the impact point lies therefore partly at the side of the strip to be struck and it may even cover an adjacent strip fluorescing in a different color. The quality of the color display is thus drastically reduced.

The shadow-mask tube and the chromatron using three electron beams in an equilateral triangle configuration comprise a complicated, dynamic, radial convergence unit operating electro-magnetically. Each electron beam (three) and each direction of deflection (two) require a definite sawtooth current and a definite parabolic current so that twelve control-members are necessary. The tendency is to strongly reduce this number of control-members for the dynamic radial convergence unit by using anastigmatic deflection coil systems so that substantially equal convergence currents can be employed. For the deflection axes on the display screen a satisfactory convergence is thus obtained, but at the corners color errors appear for lack of convergence of the three electron beams at said places. Such a simple solution for the dynamic convergence is very interesting for the 110° shadow-mask tube, but it gives rise to very coarse color errors at the corners, so that this solution can not at all be applied to the known display devices. Similar errors appear in the shadow-mask tube and the chromatron using three electron beams in a flat plane normal to the display screen and astigmatic deflection coil systems, whilst a dynamic convergence unit is not required.

The object of the invention is to use simple means in display devices for color television comprising cathode-ray tubes of the indexing, chromatron or shadow-mask type to obtain a satisfactory impact of the single electron beam or of the three electron beams throughout the picture screen (without the need for a complicated convergence unit in the case of an equilateral triangle configuration). The display device according to the invention is characterized in that in order to eliminate display errors on the screen of the cathode-ray tube due to the anisotropic astigmatism of the deflection coil systems the display device comprises correction means which pass unequal deflection currents through the two symmetrical coil halves of the first deflection coil system, which unequality corresponds to a correction current which depends upon the product of the instantaneous value of the deflection current through the second deflection coil system and of the deflection current through the first deflection coil system.

The invention is based on the recognition of the fact that apparently different errors in the different types of cathode-ray tubes originate from a common phenomenon. The effect of this phenomenon which is termed the anisotropic astigmatism, can be corrected in a simple manner according to one aspect of the invention in the various types of cathode-ray tubes. A first step of the invention resides in that with respect to the second deflection coil system the first one conveys a high-frequency deflection current, i.e. the line deflection current, in which first deflection coil system the coil halves are connected to each other at one end and at the other end to the correction means of inductive nature. A second step according to the invention consists in that with respect to the second deflection coil system the first one conveys a low-frequency deflection current, i.e. the frame deflection current, in which first deflection coil system the coil halves are connected to each other at one end and at the other end to the correction means of ohmic nature.

A further embodiment of a display device according to the invention is characterized in that it comprises a cathode-ray tube particularly of the shadow-mask or chromatron type having three electron beams in an equilateral triangle configuration and an anastigmatic first and second deflection coil system. In this further embodiment the device may be characterized in that by means of a single, electrostatic, dynamic radial convergence unit radial convergence is applied simultaneously to three electron beams. In a further embodiment the device may comprise a cathode-ray tube particularly of the shadow-mask or chromatron type having three electron beams in a flat plane normal to the display screen and an astigmatic first and second deflection coil system. A further embodiment is characterized in that the display device comprises an indexing tube having astigmatic first and second deflection coil systems.

The invention will be described more fully by way of example with reference to the figures.

FIGURE 1 illustrates the principle of the construction of a display device according to the invention.

FIGURES 2*a* and 2*b* illustrate the errors observed on display screens to be obviated.

FIGURE 3 illustrates the manner of obviating the observed errors.

FIGURES 4*a* and 4*b* illustrate an explanation of the residual errors of FIGURE 2*b*.

Figure 1:
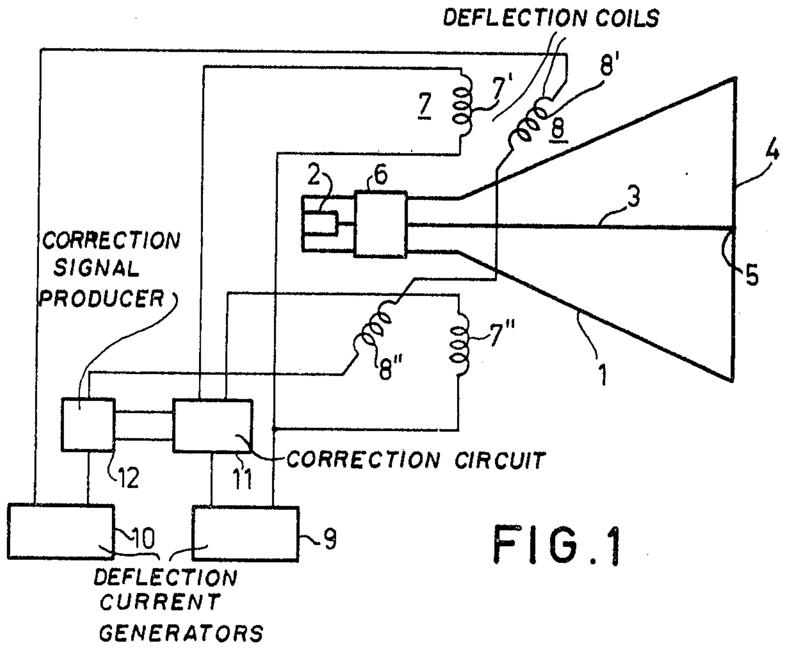

FIGURE 1 shows diagrammatically a cathode-ray tube 1 having an electron gun 2 producing an electron beam 3, which strikes a display screen 4 at a point of impact 5. The type of color television cathode-ray tube 1 is not defined, since this tube may be an indexing tube, a shadow-mask tube or a chromatron tube. Therefore, the structural differences near or on the display screen 4 are not shown; the display screen 4 is considered to have phosphors arranged in strips or dots. The means 6 may serve for acceleration, focusing and/or convergence of one or more electron beams 3 in accordance with the types of cathode-ray tube 1. Parts required furthermore for the operation of the cathode-ray tube 1 but not being essential for a good understanding of the principle of the invention are omitted from FIGURE 1.

The electron beam 3 is deflected in two orthogonal directions by a first and a second deflection coil system 7 and 8 respectively, each having coil halves 7', 7'' and 8'' respectively. Deflection current generators 9 and 10, which may be provided in known manner with output transformers, supply deflection currents to the deflection coil systems 7 and 8 with such an amplitude and a high or low frequency that the impact point 5 of the electron beam 3 traces lines in a frame on the display screen 4. Since the first deflection coil system 7 in the embodiment of FIGURE 1 is supposed to produce the lines, which usually extend in a horizontal direction in the known television systems, this deflection system will be termed hereinafter the horizontal degection coil system 7; the second system is therefore termed the vertical deflection coil system 8. From the further description it will be apparent that the principle of the invention is true also when the deflection functions are interchanged. The brightness of the phosphor at the impact point 5 on the display screen 4 may be varied in a conventional manner (not shown) by varying the current intensity of the electro beam 3 produced by the electron gun 2 in accordance with the television signal.

In accordance with the basic idea of the invention the known display device described above is provided with correction means 11 which produce an unequality between the deflection currents through the coil halves 7' and 7'' in accordance with the information from the means 12 concerning the instantaneous value and the direction of the deflection current through the vertical deflection coil system 8.

According to the invention this unequality should correspond to a correction current which depends upon the product of the instantaneous value of the deflection current through the vertical deflection coil system 8 and of the deflection current through the horizontal deflection coil system 7. The normally equal deflection currents through the coil halves 7'' and 7' correspond to two magnetic poles of different kind and of equal strength, for example a north pole N and a south pole S. The correction current increases one deflection current and decreases the other so that one pole becomes stronger and the other pole becomes weaker. In this embodiment this may be illustrated by a stronger north pole $N+n$ and a weakened south pole $S+n$ or a weakened north pole $N+s$ and a stronger south pole $S+s$. As a result the varying correction produces a magnetic quasi-quadripole ($n$, $n$; $s$, $s$) of variable strength.

Figure 2A:
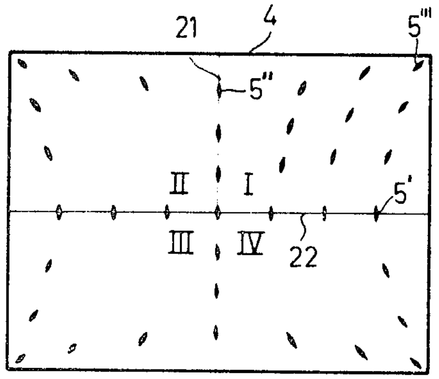
Figure 2B:
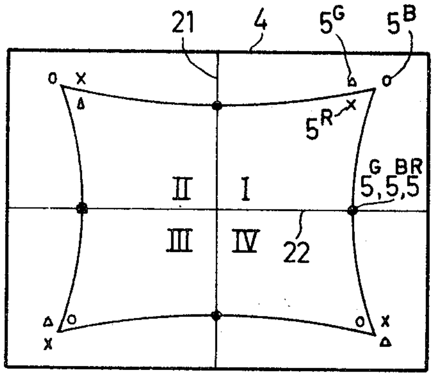

The step according to the invention serves for obviating errors of the kind shown in FIGURES 2*a* and 2*b*. FIGURE 2*a* shows a display screen 4 of a cathode-ray tube 1 of the indexing type, and FIGURE 2*b*, shows the same for a shadow-mask tube. A similar kind of errors as in FIGURE 2*b* appears in a chromatron employing three electron beams 3. The display screen 4 is divided by two deflection axes 21, 22 into four quadrants I to IV. The deflection axes 22, 21 are obtained by supplying a deflection current only to the horizontal deflection coil system 7 and to the vertical deflection coil system 8 respectively. The deflection coil system 7 traces the lines substantially parallel to the deflection axis 22. From FIGURES 2*a* and 2*b* it will be apparent that no correction of the frame distortion in the form of a cushion distortion is applied.

The display screen 4 of FIGURE 2*a* is suitable for use interalia in a cathode-ray tube 1 in which the electron gun 2, having an elliptical exit aperture and the structure of the deflection coil systems 7 and 8 provide an elliptical shape of the impact point 5. The display screen 4 has phosphor strips (not shown), extending parallel to the vertical deflection axis 21; the longitudinal axis of the elliptical impact point 5 should extend in the direction of length of said strips. On part of the display screen 4 this can be achieved by means of coma-free, astigmatic deflection coil systems 7 and 8. The astigmatism means that an electron beam 3 deflected by the deflection coil system 7 or 8 has a meridional and a sagittal focal line instead of having one focus. By causing the meridional and the sagittal focal lines of the horizontal deflection coil system 7 and of the vertical deflection coil system 8 respectively to lie on the display screen 4, it is ensured that the longitudinal axis of the elliptical impact point 5 coincides on the deflection axes 21, 22 with the vertical direction. This is illustrated in FIGURE 2*a* by impact points 5' and 5''. However, it appears, when the electron beam 3 is deflected simultaneously in a horizontal direction and in a vertical direction a rotation of the longitudinal axis of the impact point 5 (see impact point 5''' in quadrant I) occurs. In the various quadrants I to IV this rotation is performed as is indicated in FIGURE 2*a* and it increases with an increasing deflection.

The display screen 4 of FIGURE 2*b* is associated with a cathode-ray tube 1 of the shadow-mask type comprising one or three electron guns 2 producing three electron beams 3 in an equilateral triangle configuration. Each electron beam 3 represents one of the three fundamental colours red, green and blue and the circular impact points 5 on the display screen 4 are designed by $5^R$, $5^G$ and $5^B$. In order to obtain a picture of pure colours the three electron beams 3 should strike in common one area of a shadow-mask (not shown). On the display screen 4 this satisfactory convergence is indicated by the superimposition of the impact points $5^R$, $5^G$ and $5^B$. It is found that on the deflection axes 21 and 22 the requirement of color coincidence can be satisfied by means of anastigmatic deflection coil systems 7 and 8 and of a single, dynamic, radial convergence unit (instead of a triple unit as in the known devices). This unit is represented in FIGURE 1 by the means 6 of electrostatic nature. Owing to the similar convergence of each electron beam 3 color errors are left, which become greater towards the corners of the screen 4 and which are due to the fact that the impact points $5^R$, $5^G$ and $5^B$ at the corners are not obtained by electron beams striking one place of the shadow mask. FIGURE 2*b* shows in the quadrants I to IV the residual errors observed on a display screen 4 in comparison with a frame traced without residual errors.

Figures 3, 4A, 4B:
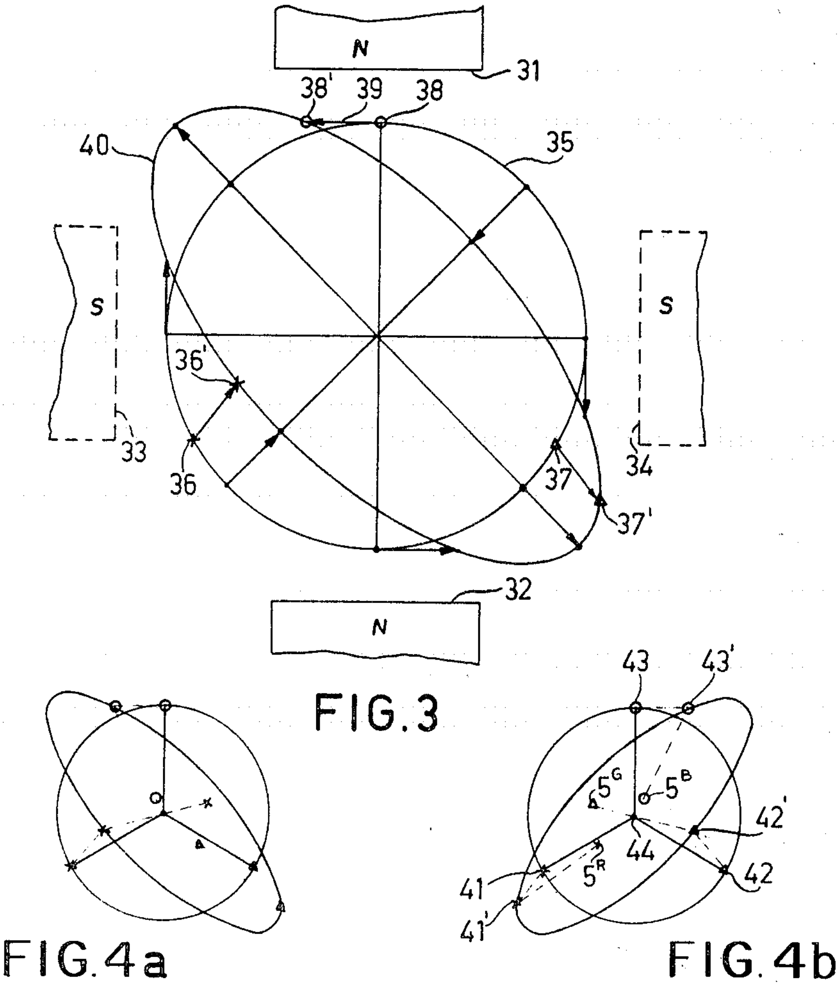

With reference to FIGURES 3 and 4 it will be described how in accordance with the invention (see FIGURE 1) these apparently different errors as shown in FIGURES 2*a* and 2*b* can be obviated in a simple manner.

FIGURE 3 shows partly four magnets with two north poles 31, 32 and two south poles 33, 34. Like poles are arranged opposite each other and form one pair and one pair is at right angles to the other pair so that a magnetic quadripole is obtained. In this quadripole field a circle 35 is drawn, which is supposed to be covered by electron beams emanating from the plane of the drawing; a few beams are indicated by the points 36, 37 and 38. The field of the north pole 31 in the quadripole field is turned away from the pole 31 and from the right-hand rule it follows that the electron beam indicated by point 38 is subject to a force in the direction of the arrow 39, when entering the quadripole field. When the beam leaves the quadripole field, the point 38 in the circle 35 has shifted in the direction of the arrow 39 so that the electron beam concerned leaves the quadripole field at point 38'. For the points 36 and 37 of the circle 35, associated with the electron beams entering the quadripole field the shift to 36' and 37' respectively is indicated. When the beams leave the quadripole field, the circle 35 has changed into an ellipse 40. It will be apparent that the shape of the ellipse, that is to say, the shift of the various points, depends upon the strength of the quadripolar field. The same effect may be obtained by omitting the south poles 33 and 34 so that the north poles 31 and 32 produce a quasi-quadripolar field and conversely.

From the foregoing it will be apparent that a circle 35 formed by the electron beams changes by a quasi-quadripolar field into a tilted ellipse 40. Therefore, an electron beam formed by electron rays in a circle 35 and thus having a circular section assumes a tilted elliptical section by traversing a virtual or quasi-quadripolar field. Conversely, an electron beam of elliptical shape is tilted when traversing a quadripolar field.

A comparison between FIGURES 3, 2*a* and 1 shows that an electron beam 3 of elliptical section, deflected by deflection coil systems 7 and 8, has an elliptical impact point 5''' in the quadrant I of the display screen 4, which point exhibits a rotation or a turn in the right-hand direction. This is due to the anisotropic astigmatism of the deflection coil systems 7 and 8, which according to the theory of the invention becomes manifest in a direction towards the corners of the display screen 4 owing to the increasing strength of a quasi-quadripolar field. According to the invention an opposite quasi-quadripolar field is superimposed on the magnetic field for the horizontal deflection, which field corresponds in the quadrant I to two electromagnetically produced north poles. The two fields are produced by the deflection coil system 7, since the current passing through the coil half 7'' exceeds that passing through the coil half 7'. As stated above, this corresponds for the impact point 5''' to a north pole $N+n$ and a south pole $S+n$.

In this manner the elliptical electron beam 3 is tilted in the left-hand direction. When in the quadrants I and III, II and IV it tilts in the left-hand direction by two north poles and in the right-hand direction by two south poles. This tilting is rendered dependent upon the instantaneous values of the deflection currents of the horizontal and vertical deflection coil systems 7 and 8. The right-hand and left-hand rotations respectively due to the anisotropic astigmatism are obviated, as is shown by the errors on the display screen 4.

With reference to FIGURES 4*a* and 4*b* the residual errors in FIGURE 2*b* for a shadow-mask tube will be explained. It will be supposed that anastimgatic deflection coil systems 7 and 8, and a single dynamic radial convergence unit formed by means 6 providing the same convergence for the three electron beams 3 are used.

FIGURE 4*b* serves for explaining the residual errors indicated in the quadrant I of FIGURE 2*b*. If the anisotropic astigmatism has no effect and if the radial convergence is too small, the deflection coil systems 7 and 8 deflect the three electron beams 3 so that they strike the display screen 4 at points 41, 42 and 43. Since the three electron beams 3 are produced by a single electron gun 2 having three exit apertures in an equilateral triangle configuration or by three electron guns 2 in a similar configuration, the impact points 41, 42 and 43 corresponding to the red, green and blue electron beams 3 respectively, are also located at the corners of an equilateral triangle. With a correct radial convergence, the three electron beams 3 pass through one place of the shadow mask, indicated by point 44. This corresponds to the indications on the deflection axes 21 and 22 of FIGURE 2*b*.

If anisotropic astigmatism appears and if the convergence is too small, the points 41, 42 and 43 on the display screen 4 shift towards 41', 42' and 43' respectively (cf. the rotation indicated in the quadrant I of FIGURE 2*a* for point 5'''). In the case of an equal radial convergence for the three electron beams 3, adapted to the optimum to the axes 21 and 22 the points 41', 42' and 43' shift towards the respective points $5^R$, $5^G$ and $5^B$. This shows the cause of the residual errors in the quadrants I and III of the display screen 4 of FIGURE 2*b*. FIGURE 4*a* relates to the residual errors in quadrants II and IV. From this explanation of the residual errors it will be apparent that they can be obviated in the manner described with reference to FIGURES 2*a* and 3 for the elliptical electron beam 3.

When three electron beams 3 in one flat plane normal to the display screen 4 are used, residual errors also appear due to the anisotropic astigmatism. Also in this case the effect of the anisotropic astigmatism can be obviated by means of a quasi-quadripolar field.

Figure 5:
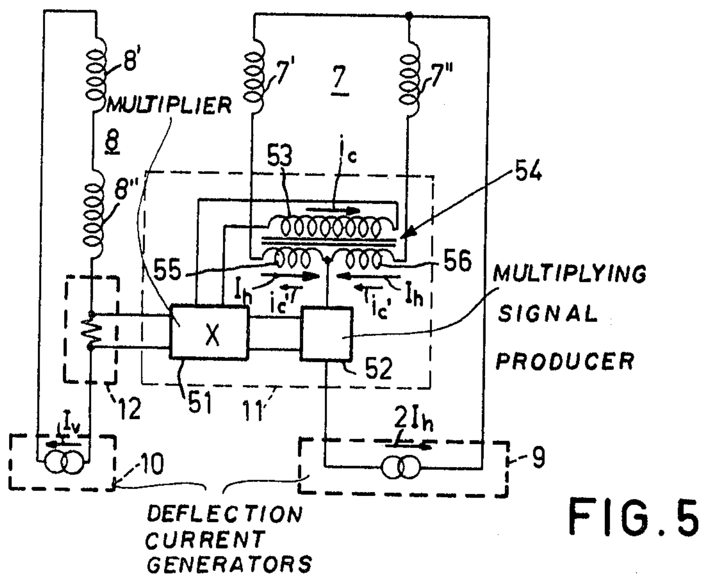
FIGURE 5 shows an embodiment of part of a display device according to the invention.

FIGURE 5 shows one embodiment of part of the display device according to the invention. The elements referenced in FIGURE 1 are designated by the same numerals in FIGURE 5 and in the further figures. Through the means 12 the deflection current generator 10 supplies a more or less sawtooth-like deflection current $I_v$ to the vertical deflection coil system 8. The means 12 (constructed as a shunt) supply information about the instantaneous value and the direction of this current $I_v$ to the multiplier 51 of the correction means 11. The multiplier 51 receives, furthermore, through the means 52, information about the instantaneous value and the direction of the deflection current $2I_h$ supplied by the deflection current generator 9 to the horizontal deflection coil system 7. Thus the multiplier 51 delivers a correction current $i_c$, which is proportionate to the product of the deflection currents $I_v$ and $I_h$. In accordance with the directions of the deflection currents $I_v$ and $I_h$ the direction of the correction current $i_c$ varies from positive to negative or conversely at the transition from one quadrant to the other. As stated above, this is necessary because the correcting quasi-quadripolar field for the quadrants I and III has to differ from that for the quadrants II and IV. The correction current $i_c$ is supplied to the primary winding 53 of a transformer 54, having a secondary winding consisting of two portions 55 and 56. The free end of the winding portions 55 and 56 is connected to that of the coil half 7' and 7'' respectively. The correction current $i_c$ induces in the winding portions 55, 56 a correction current $i_c'$, which produces a deflection current $I_h-i_c'$ across the coil half 7' and a deflection current $I_h+i_c'$ across the coil half 7''. Thus the deflection coil system 7 produces a normal deflection field (by $I_h$) and a quasi-quadripolar field (by $i_c'$), the strength of the latter depending upon the product of the deflection currents $I_v$ and $I_h$.

The simplicity of the system according to the invention will be apparent from the following. When the coils 7′ and 7″ of FIGURE 1 are wound in clockwise direction and when a line is drawn in the quadrant I of the display screen 4 (FIGURES 2*a* and 2*b*), the coils 7′ and 7″, viewed away from the cathode-ray tube 1, have a south pole and a north pole respectively. The direction of the current passing through the coils 7′ and 7″ then corresponds with the direction of $I_h$ of FIGURE 5. In the quadrant I a left-hand rotation (impact point 5‴) is wanted, which corresponds to a quadripolar field with two north poles produced by the coils 7′ and 7″. This is achieved by weakening the south pole of the coil 7′ ($I_h - i_c'$) and strengthening the north pole of the coil 7″ ($I_h + i_c'$.) In the quadrant II the direction of the current $I_h$ is reversed, so that it can be indicated by $-I_h$. Since $I_v$ in the quadrants I and II has the same direction $i_c'$ also has the reverse direction and therefore is $-i_c'$. Consequently, the coil 7′ has a current $-I_h + i_c'$ and the coil 7″ has a current $-I_h - i_c'$. The coil 7′ thus has a weakened north pole and the coil 7″ has a strengthened south pole, which corresponds to a quasi-quadripolar field produced by two south poles. The result is a right-hand tilting in the quadrant II. The same applies to the quadrants III and IV.

Figure 6:
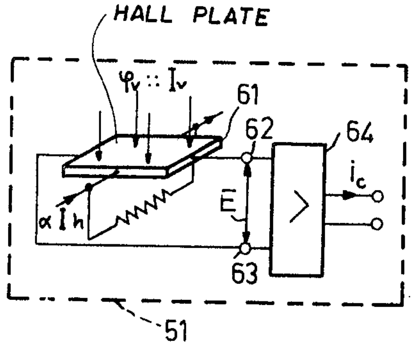
FIGURE 6 shows an embodiment of a detail of FIGURE 5.

Obviously the multiplier 51 may be equipped with tubes or transistors in known manner. FIGURE 6 shows one embodiment of the multiplier 51, in which the Hall effect is utilized in a particularly simple manner. When a Hall plate 61 is arranged in a small air gap of an output transformer of a current generator 10 supplying the vertical deflection current $I_v$, the magnetic field having a flux $\varphi_v$ proportionate to $I_v$ can be directly utilized. When in the manner shown in FIGURE 6 a current $\alpha I_h$ proportionate to the horizontal deflection current $\alpha$ is a proportionality factor) is supplied to the Hall plate 61, a voltage E is obtained at the terminals 62 and 63, which is proportionate to the product of the currents $I_v$ and $I_h$. This voltage E may be applied to the amplifier 64, which supplies the said correction current $i_c$. Obviously the magnetic field of the Hall plate 61 may also correspond to the horizontal deflection current $I_h$, whilst the current $I_v$ is supplied to the plate 61

Figure 7:
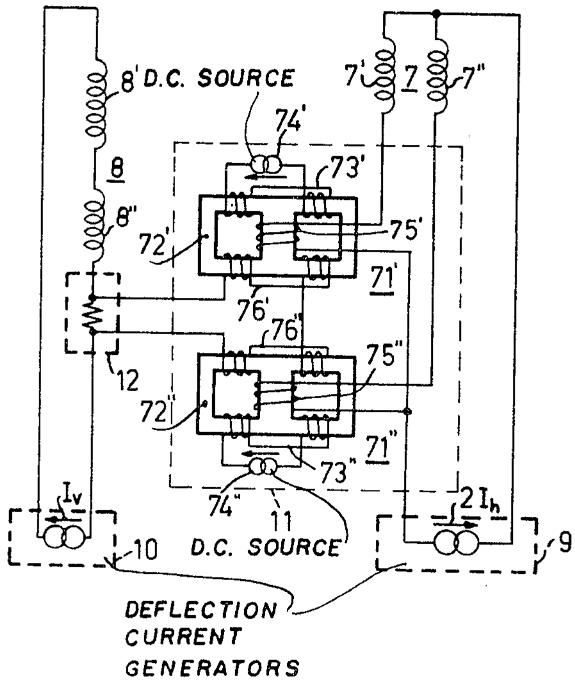
FIGURE 7 shows a further embodiment of part of a display device according to the invention.

FIGURE 7 shows one embodiment of a display device according to the invention, in which the correction means 11 are provided with transductors. The transductors 71′ and 71″ are of identical structure so that only the transductor 71′ will be described more fully. The transductor 71′ comprises a core 72′ of a material having a non-linear BH-curve on which various right-hand windings are provided, which may consist of a plurality of portions. In order to provide premagnetisation, the winding 73′, consisting of two portions, is connected to the direct-current source 74′, so that a constant flux is produced in the central limb of the core 72′. This flux could also be obtained by means of permanent magnets. The said central limb of the core 72′ is provided with a winding 75′, which is connected between the horizontal deflection current generator 9 and the deflection coil 7′. The transductor 71′ has furthermore a winding 76′, consisting of two portions. The means 12, which provide information about the instantaneous value and the direction of the vertical deflection current $I_v$, are connected to series-connected windings 76′ and 76″.

The windings 76′ and 76″ are connected in such a manner that the fluxes produced at a given value of the vertical deflection current $I_v$ in the central limbs of the cores 72′ and 72″ have opposite senses with respect to said premagnetisation, so that a weakened and a strengthened flux in the central limb of the core 72′ corresponds to a strengthened and a weakened flux respectively in the central limb of the core 72″. Since the inductances of the windings 75′ and 75″ increase with a decreasing flux and conversely, an increased and a decreased impedance of the winding 75′ corresponds with a decreased and an increased impedance of the winding 75″ respectively.

The frequency of the more or less sawtooth-like current $I_h$ is in the example described considerably higher than that of the current $I_v$, so that the instantaneous value of $I_v$ may be considered to be constant for one line period. The impedance difference between the windings 75′ and 75″ depends upon said constant value so that the deflection currents through the coil halves 7′ and 7″ are not equal. Thus a quasi-quadripolar field is produced in the cathode-ray tube 1, the magnetic field strength of which is represented by the difference between the currents through the equal coils 7′ and 7″ which results in a difference between the voltages drops across the two coils. The value of said difference between the voltage drops depends for the horizontal deflection upon the instantaneous value of the sawtooth-like current $I_h$; it is at a maximum at the edges of the display screen 4 and it is equal to zero on the deflection axis 21 ($I_h$ is there equal to zero). The magnetic field strength of the quadripole proportionate to said voltage drop difference provides in this manner the rotation correction according to the invention. The current directions indicated in FIGURE 7 go for the maximum value of the more or less sawtooth-like deflection currents $I_h$ and $I_v$ with the edge in the quadrant I of the display screen 4 of FIGURE 2. The flux in the central limb of the core 72″ is greater than that of the core 72′ so that the impedance of the winding 75″ is lower than of the winding 75′. As stated above, this corresponds to a quadripolar field having two north poles and hence to a lefthand rotation.

The correction means 11 of FIGURE 7 can also provide a reduction of the east-west frame distortion as illustrated inter alia in FIGURE 2*b*. If, as is described with reference to FIGURE 5, currents $I_h - i_c'$ and $I_h + i_c'$ are passed through the coils 7′ and 7″ respectively, the normal horizontal deflection field is produced by a current $I_h$ and the quadripolar field by a current $i_c'$. At the edges of the display screen 4 extending parallel to the deflection axis 21 (FIGURE 2) $I_h$ attains its amplitude which is constant throughout the screen 4, which gives rise to the known east-west frame distortion. However, if in the quadrant I the currents $I_h - i_c''$ and $I_h$ are passed through the coils 7′ and 7″, wherein $i_c''$ is a function of $(I_h.I_v)$, the current through the coil 7′ is $I_h - \frac{1}{2}i_c'' - \frac{1}{2}i_c''$ and the current through the coil 7″ is $I_h - \frac{1}{2}i_c'' + \frac{1}{2}i_c''$. The current $I_h - \frac{1}{2}i_c''$ produces a normal deflection field, whereas the current $\frac{1}{2}i_c''$ produces a quadripolar field. It appears that the amplitude $\pm(I_h - \frac{1}{2}i_c'')$ of the more or less sawtooth-like, horizontal deflecton current at the edges (east-west) in the quadrants I and II of the display screen 4 depends upon the instantaneous value of the vertical deflection current $I_v$, so that the east-west frame distortion is reduced. In the quadrants III and IV the simultaneous elimination of the frame distortion and of the effect of the anisotropic astigmatism requires the coil 7′ to convey the current $I_h$ and the coil 7″ to convey the current $I_h - i_c''$. This implies for the quadrants I and II, and III and IV that the windings 75″ and 75′ respectively should have an inductance which does not depend upon the deflection current $I_v$. By means of the transductors 71′ and 71″ this can be achieved by premagnetizing them to the satured state so that the deflection current $I_v$ will result only in the case of demagnetisation, in an increase of the inductance of the windings 75′ and 75″ respectively.

Obviously any asymmetry of the impedance adjustment operating in the sense described above will have a similar effect. Such as asymmetry often occurs in transductors 71′, 71″ not premagnetized to substantially the linear portion of the BH-curve of the core material. Consequently, by the choice of the correct extent of premagnetisation the east-west frame distortion can be reduced in a simple manner.

Figure 8:
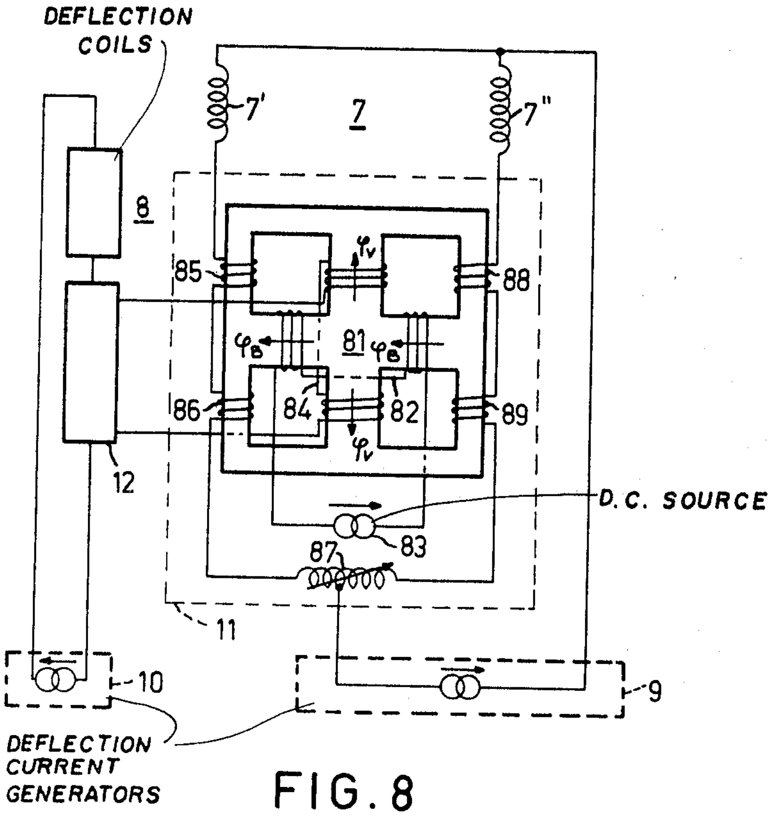
FIGURE 8 shows a further embodiment.

FIGURE 8 shows a further embodiment of a transductor circuit of the kind shown in FIGURE 7, in which not only the anisotropic astigmatism but also the east-west frame distortion can be eliminated. The transductor 81, which may comprises two E-shaped cores and an intermediate piece or for instance four annular cores, has four windings wound in the right-hand sense and consisting each of two portions. The winding 82 serves for the premagnetisation of the transductor 81 and is connected for this purpose to a direct-current source 83. The information about the instantaneous value and the direction of the vertical current $I_v$ is supplied by the means 12 to the winding 84. The winding portions 85 and 86 are connected in series between the coil half 7' and a control-coil 87, a tapping of which is connected to the horizontal deflection current generator 9. Between the coil half 7'' and the other end of the control-coil 87 winding portions 88 and 89 are connected in series. The control-coil 87 serves for obtaining static symmetry of the two parallel-connected portions of the deflection system 7.

The circuit including the transductor 81 operates as follows. When the windings are wound in right-hand direction and when the currents flow in the directions indicated in FIGURE 8, the winding portions 85 and 86 have a flux consisting of the premagnetisation flux $\varphi_B$ minus the flux $\varphi_V$ produced by the vertical deflection current. The winding portions 88 and 89 have a flux $\varphi_B$ plus the flux $\varphi_V$. Thus in the quadrant I of the display screen 4 (FIGURE 2) the effect of the anisotropic astigmatism is eliminated by means of a quasi-quadripolar field.

In the quadrant I the frame distortion is eliminated by connecting the winding portions 85, 86 and 88, 89 in such manner that the direction of the flux $\varphi_B-\varphi_V$ and $\varphi_B+\varphi_V$ respectively does not match the direction of the field produced by the horizontal deflection current through the winding portions 85 and 89 respectively, whereas it does match that of the winding portion 86 and 88 respectively. As is known, the demagnetizing effect of a current on a premagnetisation flux exceeds the magnetizing effect. High values of the horizontal deection current through the winding portions 7' and 7'' result by the demagnetizing effect in a further increase of the impedance formed by the winding portions 85 and 86 and in a smaller reduction of that of the winding portions 88 and 89. As a result the total impedance of the deflection coil system 7 and the correction means 11 is comparatively higher so that the frame distortion is reduced. Similar explanations apply to the other quadrants of the display screen 4.

Figure 9:
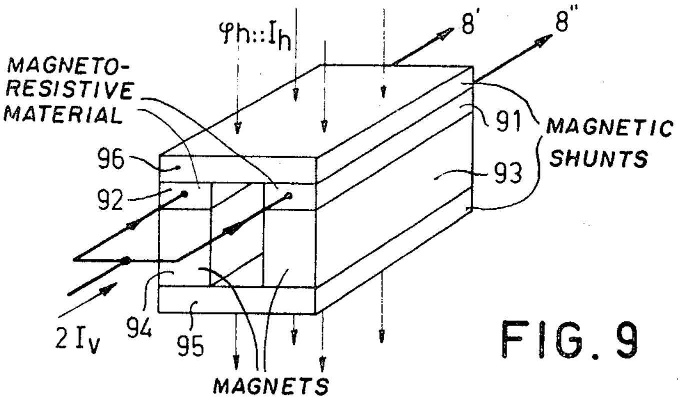
FIGURE 9 shows a final embodiment.

FIGURE 9 shows part of one embodiment of a display device according to the invention, in which the quasi-quadripolar field for eliminating the effect of the anisotropic astigmatism is produced by the vertical deflection coil system 8. In connection with the ohmic nature of the coil system 8 for the vertical deflection current $I_V$ the dynamically controlled asymmetry of the deflection currents through the coils 8' and 8'' is obtained by means of controllable resistors. FIGURE 9 shows resistors 91 and 92, which depend upon a magnetic field. These resistors may have NiSb-needles which operate as electric conductors in an InSb-mass of poor conductivity. According as the magnetic induction of a field at right angles to the direction of the needle and the direction of the current, which directions are also at right angles to each other, has a higher or lower value, the resistors 91 and 92 have a higher or a lower value. Such resistors are described inter alia in the article "Indiumantimonid mit gerichtet eingebauten, elektrisch gut leitenden Einschlüssen: System InSb-NiSb" by H. Weiss and M. Wilhelm in "Zeitschrift für Physic," 176, 1963, pages 399 to 408.

Since, as stated above, the resistors 91 and 92 have to change in opposite senses, premagnetisation is employed. The magnets 93 and 94, which may be permanent magnets or electro-magnets, together with magnetic shunts 95 and 96, form a block which may be arranged in the air gap of the horizontal output transformer (not shown) in the deflection current generator 9. The magnetic pole between the magnet 94 and the resistor 92 is unlike that between the magnet 93 and the resistor 91 and the magnetic fields close around the shunts 95 and 96. If the pole of the magnet 94 at the resistor 92 is a north pole, the magnetic field of the flux $\varphi_h$ is found to weaken, in proportion to the horizontal deflection current $I_h$, the field of the resistor 92 and strengthen that of the resistor 91. Thus the value of the resistor 92 decreases and that of the resistor 91 increases. Thus unequal energizing currents will flow to the coils 8' and 8'', so that by the correct direction of rotation of the quasi-quadripolar field the effect of the anisotropic astigmatism is obviated.

What is claimed is:

1. A color television display system comprising a cathode-ray tube having a display screen and a first and a second deflection coil system, said first coil system comprising two substantially symmetrical coil halves arranged one on each side of the neck of the cathode-ray tube, said deflection coil systems being arranged to deflect at least one electron beam produced in the cathode-ray tube in two orthogonal directions by means of deflection currents in said first and second coil systems, characterized in that in order to eliminate display errors on the screen of the cathode-ray tube due to anisotropic astigmatism of the deflection coil systems the display system further comprising correction means connected to said first and second coil systems for passing correction currents through the two symmetrical coil halves of the first deflection coil system in opposite senses, whereby the total deflection currents through the coil halves are unequal, said correction currents being a function of the product of the instantaneous value of the deflection current through the second deflection coil system and of the deflection current through the first deflection coil system.

2. A color television display device as claimed in claim 1 characterized in that with respect to the second deflection coil system the first one conveys a high-frequency deflection current, in which first deflection coil system the coil halves are connected to each other at one end and at the other end to inductive correction means.

3. A color television display as claimed in claim 2 characterized in that the correction means comprise a multiplier and a transformer, to which multiplier information about the two deflection currents is applied and which provides a correction current for the primary winding of the transformer, the ends of the secondary winding of which are connected to the non-interconnected ends of the symmetrical coil halves of the first deflection coil system, said secondary winding having a central tapping to which the high-frequency deflection current is supplied.

4. A color television display device as claimed in claim 3, characterized in that the multiplier is formed by a Hall plate, which is arranged in a magnetic field produced by one deflection current whereas the other deflection current is supplied to the Hall plate.

5. A color television display device as claimed in claim 2, characterized in that the correction means comprise two transductors each of which is connected in series with one of the coil halves of the first deflection coil system, while at the other end said transductors have an interconnection to which the high-frequency deflection current is supplied, the variable inductances of the premagnetized transductors being controlled in opposite senses by the low-frequency deflection current.

6. A color television display device as claimed in claim 5, characterized in that in order to obviate east-west frame distortion, said two transductors are premagnetized to saturation.

7. A color television display device as claimed in claim 5 characterized in that said interconnection is formed by a coil having an adjustable tapping to which the high-frequency deflection current is supplied.

8. A color television display device as claimed in claim 2, characterized in that the correction means comprises one transductor having four annular cores or two E-shaped cores with an intermediate piece, said transductor being provided with two premagnetizing windings on two aligned inner limbs and with two windings traversed by the low-frequency deflection current and arranged on the other two inner limbs, the latter windings producing a reverse magnetic field and the premagnetizing windings producing a direct magnetic field, while four windings are arranged on the outer limbs of the transductor, two of which windings having substantially the same magnetic field being connected in series, the two series connections being connected each in series with one of the coil halves of the first deflection coil system, the other sides thereof having an interconnection to which the high-frequency deflection current is supplied.

9. A color television display device as claimed in claim 8 characterized in that the magnetic fields produced by the high-frequency deflection current in two windings forming together a series winding have in one winding the same direction as the premagnetizing field and have in the other winding a direction unlike that of the premagnetizing field.

10. A color television display device as claimed in claim 1 characterized in that with respect to the second deflection coil system the first one conveys a low-frequency deflection current in which first deflection coil system, the coil halves are connected to each other at one and at the other end to ohmic correction means.

11. A color television display device as claimed in claim 10 characterized in that the correction means are provided with two resistors varying with a magnetic field, and arranged with premagnetizing members in an air gap of an output transformer in a deflection current generator supplying a high-frequency deflection current for the second deflection coil system.

12. A color television display device as claimed in claim 1 characterized in that it comprises a cathode-ray tube, particularly of the shadow-mask or chromatron type having three electron beams in an equilateral triangle configuration and an anastigmatic first and second deflection coil system.

13. A color television display device as claimed in claim 12 characterized in that it comprises a single, electrostatically operating, dynamic, radial convergence unit.

14. A color television display device as claimed in claim 1 characterized in that it comprises a cathode-ray tube, particularly of the shadow-mask or chromatron type, having three electron beams lying in a flat plane normal to the display screen and having an astigmatic first and second deflection coil system.

15. A color television display device as claimed in claim 1 characterized in that it comprises an indexing tube having astigmatic first and second deflection coil systems.

References Cited

UNITED STATES PATENTS 2,829,303 4/1958 Knechtli ........... 315—24 X

RICHARD A. FARLEY, *Primary Examiner.*

T. H. TUBBESING, *Assistant Examiner.*

PO-1050
(5/69)

UNITED STATES PATENT OFFICE
CERTIFICATE OF CORRECTION

Patent No. 3,440,483 Dated April 22, 1969

Inventor(s) JOHANNES KASSHOEK ET AL

It is certified that error appears in the above-identified patent and that said Letters Patent are hereby corrected as shown below:

Column 3, line 43, after "and" (second occurrence) insert -- 8' -- ; column 3, line 54, "degection" read -- deflection -- ; column 4, line 12, before "produces" insert -- current -- ; column 4, line 31, "interalia" read -- inter alia -- ; column 6, line 2, "anastimgatic" read -- anastigmatic -- ; column 7, line 39, before "a" insert a parenthesis -- ( -- ; column 8, line 31 after "than" insert -- that -- ; column 9, line 40, "deection" read -- deflection -- .

Signed and sealed this 2nd day of September 1969 .

(SEAL)
Attest:

Edward M. Fletcher, Jr.
Attesting Officer

WILLIAM E. SCHUYLER, JR.
Commissioner of Patents